United States Patent [19]

Lázár

[11] Patent Number: 4,718,969

[45] Date of Patent: Jan. 12, 1988

[54] APPARATUS FOR MANUFACTURING A BINDING

[76] Inventor: Peter Lázár, Tannenstr. 11, D-4040 Neuss 21, Fed. Rep. of Germany

[21] Appl. No.: 780,830

[22] Filed: Sep. 27, 1985

[30] Foreign Application Priority Data

Sep. 28, 1984 [DE] Fed. Rep. of Germany ....... 3435704

[51] Int. Cl.[4] ............................................... B32B 31/20

[52] U.S. Cl. .................................... 156/500; 156/245; 412/3; 412/17

[58] Field of Search ................... 156/390, 242, 244.15, 156/245, 500, 307.3, 307.7, 230; 427/207.1, 208.2; 412/3, 17, 18, 37, 902; 118/400, 407, DIG. 3, DIG. 9; 425/120, 125, 127, 129 R, 547, 567, 574, 575; 264/135, 259, 279, 241

[56] References Cited

U.S. PATENT DOCUMENTS 3,982,988 9/1976 Heimberger ........................ 156/500
4,367,061 1/1983 Wiholm .................................. 412/3

FOREIGN PATENT DOCUMENTS 22521 11/1967 Japan .................................. 156/500

*Primary Examiner*—Caleb Weston
*Attorney, Agent, or Firm*—Shlesinger Arkwright & Garvey

[57] ABSTRACT

An apparatus for the manufacture of a binding comprising a mold consisting of a bottom, at least one side wall, and an opening, means for positioning an adhesive in said mold, a stamp for forcing said binding into said opening, and said bottom of said mold being substantially arcuate in shape.

20 Claims, 4 Drawing Figures

APPARATUS FOR MANUFACTURING A BINDING

The invention concerns a method for manufacturing a bookcover, binding or the like with at least one binding cover joining a binding back, a hot-melt adhesive being deposited on the inside of the binding back, this adhesive having previously been turned by heating into the liquid or at least the pasty state. The invention furthermore concerns an apparatus for the implementation of this method, and a binding or book-cover of the above mentioned type.

Bindings of the above species typically consist of a binding back joined by folds to binding covers at the front and back sides. Most are made of board, and the front cover may consist of a transparent plastic. Bindings of this kind illustratively are described in the German patent No. 25 28 225 and in the German Offenlegungsschrift No. 22 22 27 583.

A hot-melt adhesive is deposited on the inside of the binding back. Such hot-melt adhesives are solid at room temperature, however they become liquid between temperatures of 70° C. and 190° C., depending on composition. After the ensuing cooling, the hot-melt adhesive solidifies again, and this procedure can be repeated several times.

The above properties of the hot-melt adhesive are made use of when binding paper sheets in such a binding. The paper sheets are set by their longitudinal edges plumb to the still solid hot-melt adhesive in the binding which then is moved into a binding apparatus, for instance the one disclosed in the German Offenlegungsschrift No. 27 43 685. When in this apparatus, the binding rests by its back on a heating plate which heats the hot-melt adhesive through the binding back. Upon the liquid state being reached, the paper sheets penetrate the hot-melt adhesive, whereby the edges of the sheets are enclosed by the hot-melt adhesive. After the ensuing cooling, the paper sheets then are solidly joined to the binding back.

The above described bindings are marketed with the hot-melt adhesive fixed to the binding back. Basically, two procedures are known to deposit the hot-melt adhesive on the inside of the binding back.

In the first procedure, the hot-melt adhesive is deposited in the liquid state, that is when heated, on the binding back, and this by using an adhesive deposition-head connected to a supply vessel and a pump (see German Offenlegungsschrift No. 26 11 242 and German Offenlegungsschrift No. 29 37 171). This way of depositing offers the advantage that raw material in granular form can be used as the hotmelt adhesive, this material being comparatively economical.

However substantial problems are encountered in achieving a uniform deposition of the hot-melt adhesive over the entire length of the binding back. Due to the surface tension of the liquid hot-melt adhesive, the hot-melt adhesive so deposited assumes a beady or wrinkled shape, that is, it is thicker at the center than at the sides. Consequently, in the subsequent binding, it is precisely the paper sheets at the outside, which are the most stressed, that are held in too thin a layer of hot-melt adhesive and therefore detach easily. If additionally only a small number of paper sheets as compared to the width of the binding back is being bound, then these paper sheets may slip outward, or at least assume uneven oblique positions prior to heating the hot-melt adhesive; these are both undesirable conditions.

There is another drawback relating to the liquid deposition, namely it is impossible to achieve a precisely defined width of deposition. Again the required precise positioning of the hot-melt adhesive for the binding to be problem-free, cannot be achieved in the desired degree. Lastly this procedure also fails where the hot-melt adhesive is deposited at very narrow widths of about and less than 1 mm. As a whole, therefore, the deposition of liquid hot-melt is unsatisfactory because it is inaccurate in many ways and unequal to the demands of practice.

Improved results are obtained by a method in which the hot-melt adhesive is deposited in the form of a solid strip on the binding back and together with this back is then bonded under the effect of heat or using an additional glue. This can be done manually or by a procedure such as described in the German Offenlegungsschrift No. 30 10 642. In that procedure, a strip of hot-melt adhesive previously cut out from rolls or sheets is placed between two bending strips rising at a suitable distance from each other from a base, and then the binding is moved in place above in such a manner that its back is located above the strip of hot-melt adhesive, whereupon the binding is pressed by a compressing roller or stamp against the bending strips and the hot-melt adhesive strip. This allows both joining the binding back and the hot-melt adhesive and forming simultaneously the folds to bend the binding cover with respect to the binding back.

This procedure does achieve a strip of hot-melt adhesive which is more precisely positioned and more uniformly thick than is the case for liquid deposition. However, a substantially higher production cost is also incurred thereby. This higher cost is determined on one hand by the raw material of rolls or sheets used for the hot-melt adhesive being up to twice as expensive as the raw material for liquid deposition. On the other hand, an additional cost arises from processing the hot-melt adhesive into the desired strip shape, and part of this procedure cannot be automated either.

It is therefore the object of the invention to so create a method for depositing a hot-melt adhesive on a binding that with minimal costs it shall be possible to achieve a precisely positioned deposit of hot-melt adhesive of a desired cross-section and more uniform in width and length. Another object of the invention is to find an apparatus suitable for the implementation of this method and also a binding with an especially advantageously shaped deposit of the hot-melt adhesive.

The invention solves the first object in that the hot-melt adhesive is introduced in the heated stated into a mold open at one of its longitudinal sides, in that the binding is placed with the inside of the binding back over the open side of the mold, and in that the binding back is forced against or into this mold.

This method allows achieving a deposition of the hot-melt adhesive precisely meeting the requirements in spite of the liquid-phase processing. Therefore,the substantially more economical raw material in granular form can be used, without having to trade it off against the drawbacks hitherto occurring in liquid deposition. There is the further possibility to provide the hot-melt adhesive with practically any desired cross-section by appropriately designing the mold, and to replicate this cross-section as often as desired. Thus, one is not forced to trade off the disadvantageous cross-section occurring in the previous methods, nor is one held to the rectangular cross-section which is perforce the case for the method of the German Offenlegungsschrift No. 30 10 642.

Another advantage is that the hot-melt adhesive need not be introduced in as critical a distributed manner into the mold as is the case for the liquid deposition. When the binding back is pressed on the mold, the filled hot-melt adhesive does distribute itself at once and fully uniformly and accordingly assumes the shape predetermined by the mold. By varying the amount of hot-melt adhesive introduced, the desired strip thickness can be easily set without having to change molds. Lastly, this method is especially well suited to automatic binding processing.

Where the hot-melt adhesive is deposited in a narrow band, it may suffice to keep the hot-melt adhesive in the mold merely at its longitudinal sides in a shaping manner, so that the end sides are open. Because of the small amount of introduced hot-melt adhesive, proper dosage allows avoiding that the hot-melt adhesive flows at the end sides beyond the desired extent. If the hot-melt adhesive is kept in shaping manner at the end sides, it is possible to be more precise, especially for wider depositions of the hot-melt adhesive.

A further development of the invention provides that before being introduced in the mold, the hot-melt adhesive is heated to a temperature so much below the ordinary processing temperature that the hot-melt adhesive is in a viscous state as compared to the fully fluid state at ordinary processing temperature. When being introduced in the mold, the temperature of the hot-melt adhesive should be 40% to 80%, preferably 60% of the ordinary processing temperature at which the hot-melt adhesive is fully fluid, with the attempt being made to heat the hot-melt adhesive only so much that it is just viscous enough yet for its processing.

The invention includes the insight that it is not necessary to introduce the hot-melt adhesive in such liquid form that it automatically distributes itself within the mold. Because the binding back is pressed into the mold, a uniform distribution is achieved anyway. It was found, surprisingly, that at these temperatures the hot-melt adhesive can easily be detached from the mold without having to wait for cooling. On the other hand, it does adhere enough to the inside of the binding back so it will accompany it, joined to it, when this back is lifted out of the mold.

The invention provides further that, when the binding back is being forced into the mold, simultaneously folds shall be formed at the two longitudinal sides whereby the deposition of the hot-melt adhesive and the formation of the folds can be achieved in one operational step.

The apparatus for implementing the above described method is characterized by a mold consisting of a bottom and sidewalls and being open at one of the longitudinal sides, by a stamp means to press the binding-back into the open longitudinal side of the mold, by a heater to liquefy the hot-melt adhesive, and by a feed system to fill the liquid hot-melt adhesive into the mold. In light of the described reasons above, advantageously the mold exhibits at its ends end-walls preventing the hot-melt adhesive from flowing beyond the specified distance in those directions. In this manner, a closed mold is obtained after the binding back has been laid down, and therefore precise positioning and shaping of the hot-melt adhesive is obtained.

Appropriately, the sidewalls at the mold's longitudinal sides are designed as pleating edges to impress folds when the binding back is forced into this mold; as a result, two operational steps can be combined.

As further implementation, the invention provides a stamp displaceable with respect to the open longitudinal side of the mold. Appropriately, this stamp comprises at its operational side an elastic layer, whereby on one hand good sealing of the mold edges is achieved and on the other hand the stamp can adapt itself to the particular amount of filled-in hot-melt adhesive.

If grooves in the operational side of the stamp are associated with the upper edges of the sidewalls, this good seal will be further enhanced.

By suitably designing the mold, the hot-melt adhesive practically may assume any desired cross-section. Advantageously, the mold shall be lower near the center longitudinal axis than at the longitudinal sides. An especially preferred embodiment of the binding —which cannot be achieved using the known methods —can be obtained by the above apparatus by making its bottom arcuate toward the center longitudinal axis. In this way, the hot-melt adhesive assumes the shape of a cross-sectional recess on the side where the edges of the paper sheets are bound, and this recess guides the paper sheets toward the center to join them and keep them together there. Moreover, the deposit of hot-melt adhesive is thickest at the edges of the longitudinal sides, where the paper sheets are exposed in particular to high stresses, and accordingly the retention of these paper sheets is improved. Lastly, the possibility is provided thereby to operate with thin hot-adhesive films, that is, to save the hot-melt adhesive material.

In a further embodiment of the invention, the mold bottom is assembled in exchangeable manner to make possible, as needed, various cross-sectional shapes or thicknesses. Again, it may be appropriate to mount the bottom of the mold so to be displaceable toward or away from its open side.

The invention provides furthermore that the mold and the feed system introducing the hot-melt adhesive are movable with respect to each other. In this manner, the feed system can be fixed in place.

Appropriately, the inside walls of the mold consist of an unground steel alloy; it was found that in such a case the hot-melt adhesive is very easily removed from the mold. This can be enhanced also by cooling the mold and/or using a parting agent introduced into the mold before the hot-melt adhesive.

Another object of the invention is a binding of the initially cited kind where the hot-melt deposit is thinner near the center longitudinal axis than at its longitudinal edges; an arcuate recess toward the central longitudinal axis is especially advantageous. As already discussed above, such a cross-section is advantageous for the deposition of the hot-melt adhesive because in that case there is a maximum of hot-melt adhesive available at the edges of the longitudinal sides where the paper sheets undergo especially high stresses, and furthermore the paper sheets are guided together toward the center and are kept in place. As a result, the defect-rate when binding paper sheets is much reduced.

While the British patent document A No. 20 72 096 shows a binding of which the strip of hot-melt adhesive shown in the drawing exhibits a concave curvature at the free surface, the description of this document however does not discuss this curvature or its intended effect, if any. Rather, the U-shaped of the binding back is emphasized, and this shape causes the introduced hot-melt adhesive to stick to the side legs of the binding back. Because of this particularity, this binding too is not presented with the problem of an improved retention of the paper sheets in the edge zone of the introduced hot-melt adhesive, which on the other hand is the case for bindings of the present species with a deposit of hot-melt adhesive rising high and free from the binding back.

The invention is explained in further detail in relation to an illustrative embodiment shown in the drawing.

Figure 1:
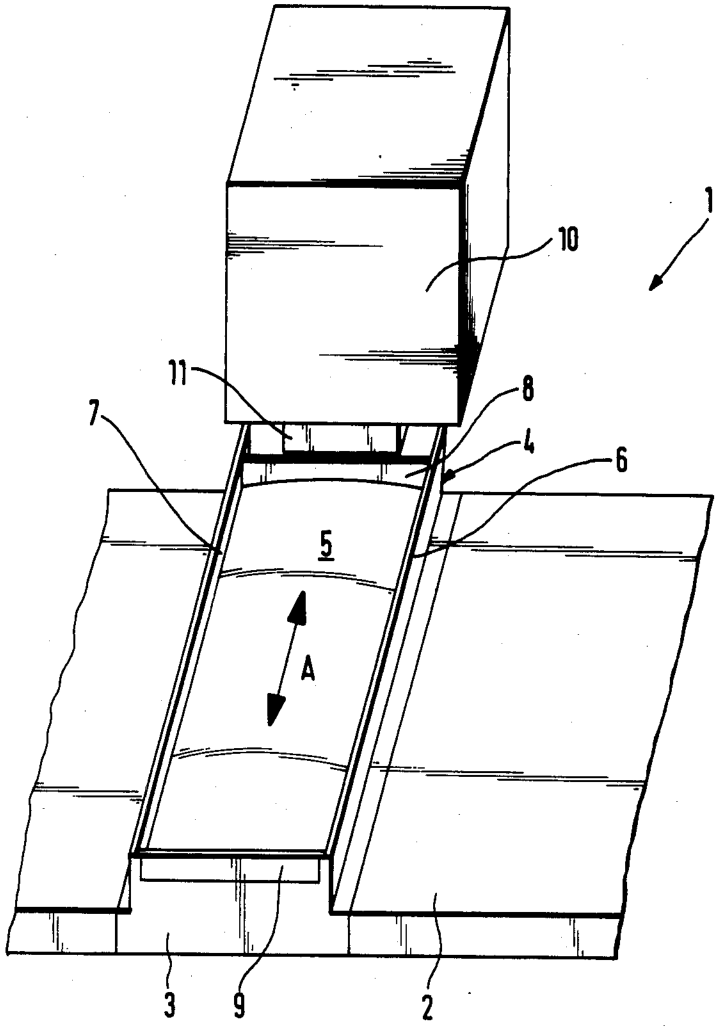
FIG. 1 is a perspective of an apparatus for manufacturing bindings.

The schematically shown apparatus of FIG. 1 is provided with a partly covered plate 2. A center piece 3 divides the plate 2 into two equal parts.

A mold 4 is mounted on the center piece 3; this mold is formed by longitudinal sides consisting of a bottom 5, two parallel, vertical and opposite longitudinal sidewalls 6,7 and of the opening at the top, and by end faces 8,9 which also are parallel, vertical and opposite. The bottom 5 is arcuate toward the center longitudinal line, as indicated more clearly in FIGS. 2 and 3.

A depositing head 10 for the hot-melt adhesive is fixed in place above the mold 4. In this case this head is shown as a rectangular box, being of a conventional design. This may,for instance,be a product made by Nordson Corp. of Atlanta, USA, of the type H 200. Below the depositing head 10 for the hot-melt adhesive there is a hot-melt adhesive extrusion die 11 by means of which the previously prepared hot-melt adhesive, for instance prepared in an omitted heater and therefore present at least in the pasty state, can be filled into the mold 4. The bead 12 is at a low temperature and therefore so viscous it does not run or flow and therefore does not fill the mold 4.

The right-hand side of the plate 2 of this Figure shows one stop 13, 14 each in the longitudinal and transverse directions permitting alignment of a binding board or sheet in relation to the mold 4. This can be seen from the cross-sectional view of FIG. 3. A binding board 15 is placed in such a manner across the mold 4 that it rests by one longitudinal edge against the stop 13 and by a transverse edge against the stop 14.

Now a stamp 16, movable in the directions of the double arrow B, now presses from above on that part of the binding board 15 which is above the mold 4 so as to move the board slightly into the mold, and thereby the bead 12 of hot-melt adhesive is uniformly distributed within the mold 4 until it has completely filled the cavity so formed. Simultaneously, the sidewalls 6,7 impress folds 17,18 in the binding board 15 whereby this board is divided into a binding back 19 and binding covers 20,21 joined to this back at each side. The stamp 16 can be driven in manner known per se, for instance using hydraulic or pneumatic cylinders which were omitted for the sake of clarity.

The stamp 16 itself is divided into two parts. It comprises a rigid pressing plate 22 to the underside of which is fastened an operational plate 23 made of an elastic material. The elasticity of this operational plate 23 is such that the sidewalls 6,7,8,9 enter it so deeply that good sealing of the mold 4 is achieved and the binding back 19 is forced so deeply into the mold 4 that the cavity is entirely filled with the hot-melt adhesive 12.

Figure 2:
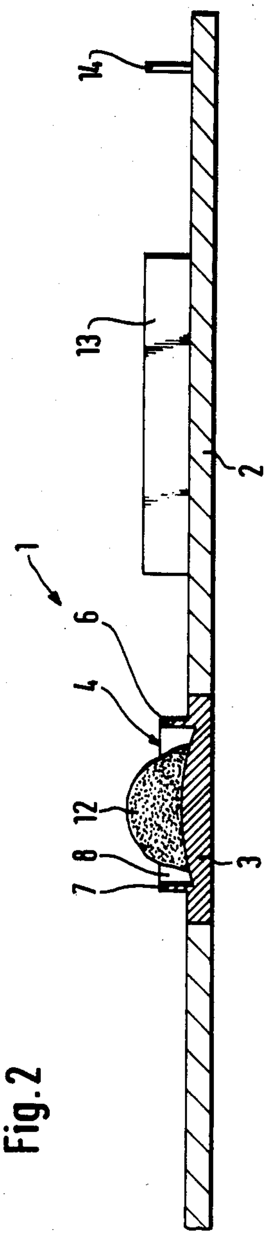
FIG. 2 is a cross-section of the apparatus of FIG. 1 after the hot-melt adhesive has been introduced.
Figure 3:
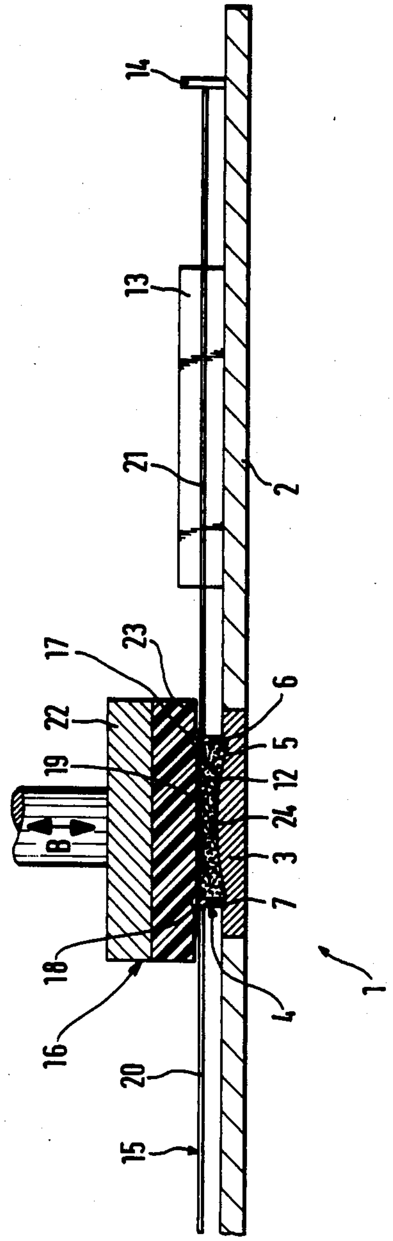
FIG. 3 is a cross-section of the apparatus of FIG. 2 when the binding is pressed-on, and FIG. 4 is the finished binding shown in perspective.
Figure 4:
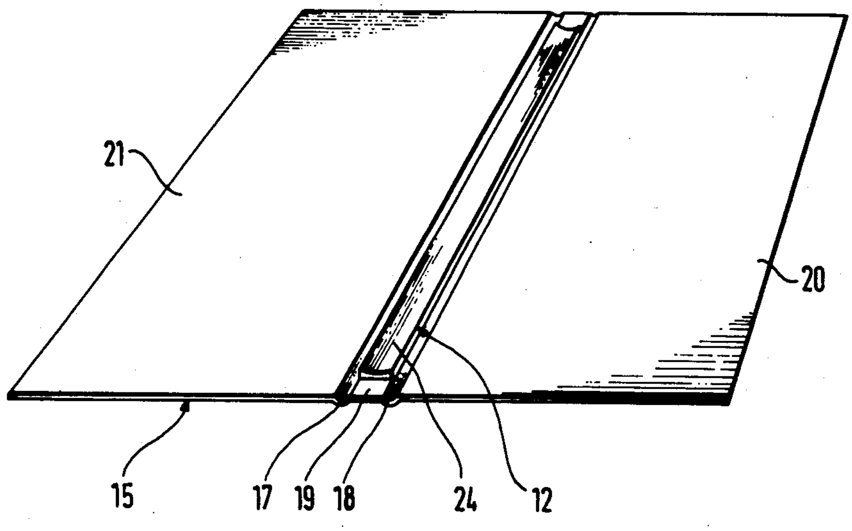

After the stamp 16 —which is omitted from FIGS. 1 and 2 —, the binding board 15 can be lifted from the base 2 and thereby it drags the hot-melt adhesive 12 out of the mold 4. Thereupon, the board has the finished shape shown in FIG. 4. Due to the convex shape of the bottom 5 of the mold 4, the hot-melt adhesive 12 exhibits a cross-sectionally trough-like recess 24, whereby the cohesion of the paper sheets placed on it when binding is enhanced and whereby furthermore the outer paper sheets are bound into an especially thick layer of hot-melt adhesive. Moreover, the impressed folds 17,18 are shown, which separate the binding back 19 from the binding covers 20, 21.

Using the above described apparatus 1, a precisely positioned deposit of hot-melt adhesive 12 on the binding board 15 and further the desired shape are obtained, and economical granulates of hot-melt adhesives can be processed. By exchanging the center piece 3, the most diverse shapes can be implemented for the deposit of hot-melt adhesive 12.

I claim:

1. Apparatus for the manufacture of a binding, characterized by a mold (4) comprising a bottom (5) and side walls (6, 7, 8, 9) and open at one longitudinal side, by a stamp system (16) to force a binding back (19) into the open longitudinal side of the mold (4), by means for holding and liquefying a supply of a hot-melt adhesive, by means operably associated with said holding means for supplying a predetermined quantity of a liquefied hot-melt adhesive to said mold, said bottom of said mold having an elevation greater near the center longitudinal line than at the edges.

2. Apparatus per claim 1, characterized in that the bottom (5) of the mold (4) is mounted in exchangeable manner.

3. Apparatus per claim 1, characterized in that the bottom (5) of the mold (4) can be moved toward and away from the open longitudinal side.

4. Apparatus per claim 1, characterized in that the mold (4) and the feed system (10,11) to introduce the hot-melt adhesive are mutually displaceable.

5. Apparatus per claim 1, characterized in that the mold (4) is provided at its ends with end-face walls (8,9).

6. Apparatus per claim 1, characterized in that the sidewalls (6,7) are structured at the longitudinal sides of the mold (4) to be bending edges to impress folds (17,18) when the binding back (19) is forced into the mold (4).

7. Apparatus per claim 1 characterized in that the stamp system (16) is equipped with a stamp (16) mounted opposite the open longitudinal side of the mold (4) and provided at its operational side with an elastic layer (23).

8. Apparatus per claim 1, characterized in that grooves corresponding to the top edges of the sidewalls (6,7,8,9,) of the mold (4) are arranged in the operational side (23) of the stampe (16).

9. Apparatus for the manufacture of a binding, comprising:

(1) a mold including a bottom, at least one side wall and an opening, (b) means for positioning an adhesive in said mold, (c) stamp means for forcing a binding into said opening so that adhesive contained therein will adhere to the binding, and (d) said bottom of said mold being substantially arcuate in shape.

10. Apparatus as in claim 9, wherein:

(a) said mold further comprises a pair of end walls extending longitudinally along said bottom and a pair of end walls extending laterally along said bottom.

11. Apparatus as in claim 9, wherein:

(a) said stamp means includes a stamp mounted opposite said opening in said mold and provided at its operational side with an elastic layer.

12. Apparatus for the manufacture of a binding, comprising:

(a) a mold including a bottom, at least one side wall and an opening, (b) means for positioning an adhesive in said mold, (c) stamp means for forcing a binding into said opening so that the adhesive contained therein will adhere to the binding, (d) said bottom of said mold being substantially arcuate in shape, (e) the adhesive is a hot-melt adhesive, (f) said positioning means including means for holding and liquefying said hot-melt adhesive, and (g) said positioning means further including a means operably associated with said holding means for supply liquefied hot-melt adhesive to said mold.

13. Apparatus for the manufacture of a binding, comprising:

(a) a mold having a bottom wall, side walls extending along opposite sides thereof, and end walls at the ends thereof for defining a mold cavity, (b) means for holding and liquefying a supply of hot-melt adhesive, (c) means operably associated with said holding means for supplying a predetermined quantity of liquefied hot-melt adhesive to said cavity, (d) stamp means operably associated with said mold for forcing the binding back into said cavity so that liquefied hot-melt adhesive contained therein will adhere to the binding back, and (e) said stamp means includes means for cooperating with said side walls for permitting a portion of said stamp to enter said mold cavity.

14. Apparatus as in claim 13 wherein:

(a) said bottom of said mold is mounted in an exchangeable manner.

15. Apparatus as in claim 13, wherein:

(a) said bottom of said mold is adjustable along the height of said side walls.

16. Apparatus as in claim 13, wherein:

(a) said mold and said supply means, directing the hot-melt adhesive into said mold cavity, are mutually displaceable.

17. Apparatus as in claim 13, wherein:

(a) said side walls extend upwardly from the bottom of said mold forming bending edges to impress folds in said binding when the binding back is forced into said mold cavity.

18. Apparatus as in claim 13, wherein:

(a) said stamp means includes a stamp mounted opposite said mold cavity and provided at its operational side with an elastic layer.

19. Apparatus as in claim 18, wherein:

(a) said cooperating means includes a pair of spaced grooves formed in said elastic layer.

20. Apparatus as in claim 13, wherein:

(a) said mold cavity having a lesser depth adjacent the center longitudinal line than adjacent said side walls.

* * * * *